United States Patent [19]

Greenleaf, Sr.

[11] Patent Number: 5,417,729
[45] Date of Patent: May 23, 1995

[54] PORTABLE MODULAR AIR CLEANING SYSTEM

[75] Inventor: Marc A. Greenleaf, Sr., Waterford, Conn.

[73] Assignee: NFS Radiation Protection Systems, Old Lyme, Conn.

[21] Appl. No.: 87,255

[22] Filed: Jul. 8, 1993

[51] Int. Cl.⁶ .............................................. B01D 46/00
[52] U.S. Cl. ...................................... 55/350.1; 55/356; 55/467; 55/472; 55/481; 55/502; 55/503; 96/131; 96/147
[58] Field of Search .............. 55/213, 320, 356, 385.2, 55/467, 477, 502, 503, 505, 315, 350.1, 481, 506; 95/273; 96/131, 147

[56] References Cited

U.S. PATENT DOCUMENTS

| | | | |
|---|---|---|---|
| 2,249,013 | 7/1941 | Levengood | 55/350.1 |
| 3,012,413 | 12/1961 | Anderson | 55/503 X |
| 3,490,208 | 1/1970 | Meyer et al. | 55/315 |
| 3,690,045 | 9/1972 | Neumann | 55/356 |
| 3,772,857 | 11/1974 | Jackson et al. | 55/503 X |
| 4,133,658 | 1/1979 | Callewyn | 55/315 |
| 4,787,922 | 11/1988 | Kulitz | 55/356 X |
| 4,838,901 | 6/1989 | Schmidt et al. | 55/320 X |
| 4,968,333 | 11/1990 | Ellis et al. | 55/350.1 |
| 5,042,997 | 8/1991 | Rhodes | 55/365.2 X |
| 5,078,764 | 1/1992 | Lutterbach et al. | 55/356 |
| 5,102,343 | 3/1993 | Henry | 55/213 |

FOREIGN PATENT DOCUMENTS 1080134  6/1980  Canada ................... 55/481

Primary Examiner—Charles S. Bushey

[57] ABSTRACT

A modular air cleaning system having at least one filter module having a closed plenum box provided with male and female air flow porting structure, one of which porting structure provides an air inlet and the other of which provides an air outlet, each of the porting structures is in substantially cylindrical form and projects outwardly from the box and each has a section of substantially the same diameter lying adjacent the box, a shoulder on each of the sections peripherally circumscribing the same at a short distance outwardly from the box and adapted to engage end portions of a flexible hose for preventing its withdrawal from the sections, the male porting structure having a reduced diameter segment lying outwardly of the adjacent section and adapted to telescope within the female porting structure of another plenum box, and an annular seal within the female porting structure adapted to engage the segment and form a substantially gas-tight seal thereagainst.

11 Claims, 6 Drawing Sheets

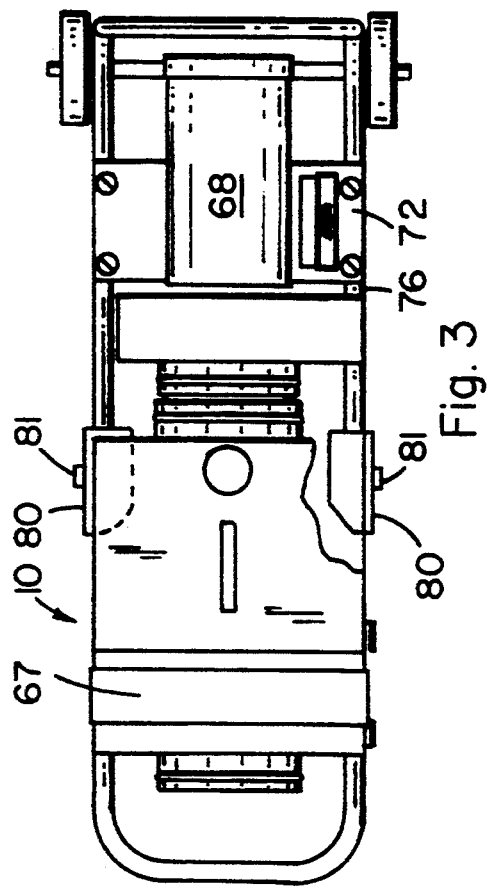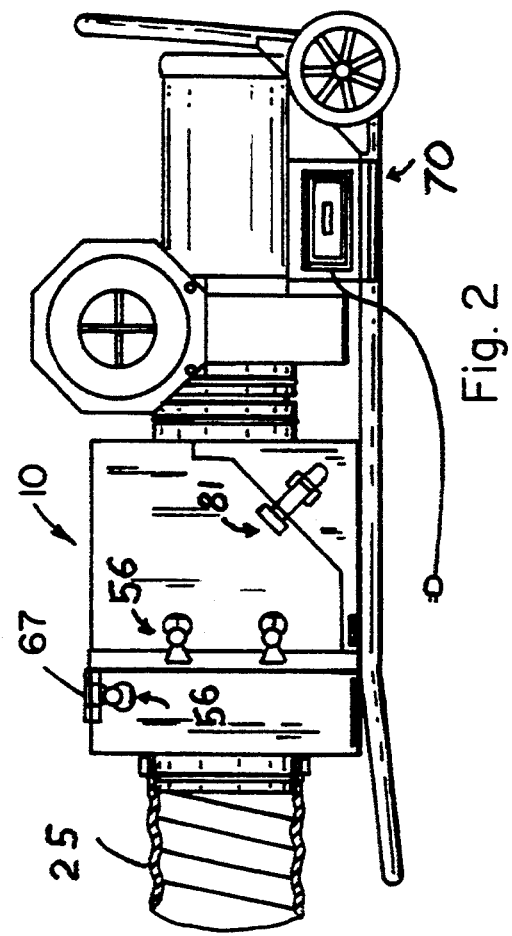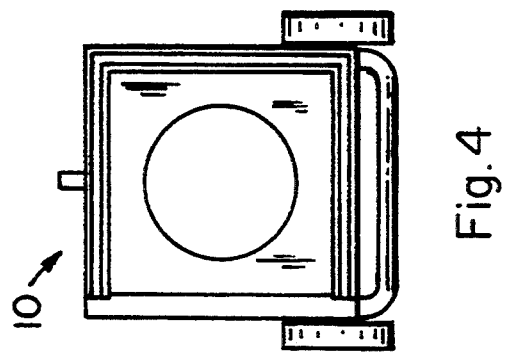

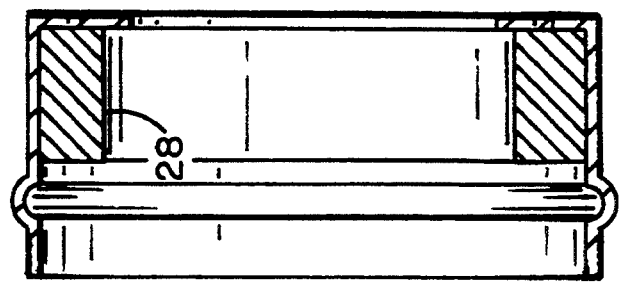
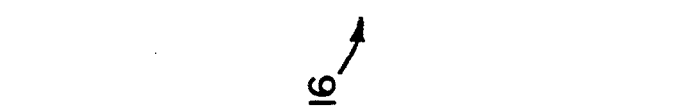
Fig. 11
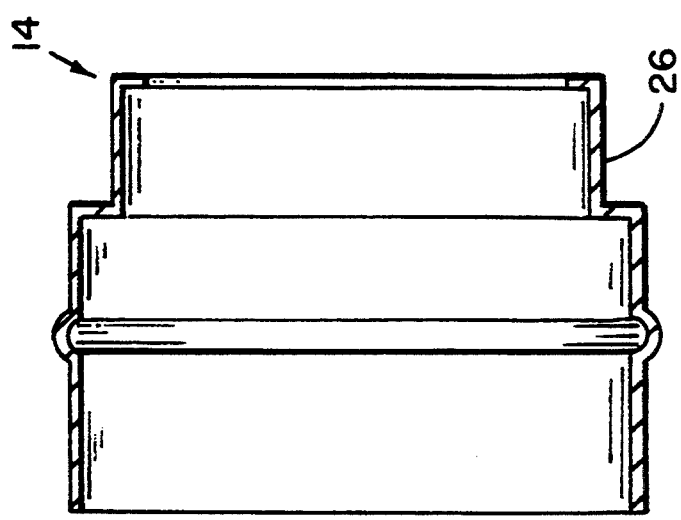
Fig. 10

PORTABLE MODULAR AIR CLEANING SYSTEM

BACKGROUND OF INVENTION

This invention concerns air cleaning systems or equipment that are used to remove undesirable hazardous, radioactive, or toxic particles, vapors or gases that can emanate, disburse, evaporate or otherwise become suspended in the air breathing zone, usually near the source of such hazardous or undesirable airborne materials. Such materials have the form, for example, of asbestos fibers, or toxic organic solvents or reactants such as benzene, totulene, or ketones, or smokes and fumes such as that emitted from welding, or fine particles such as those generated and propelled into the air from sanding paint, e.g., lead based, rust, corrosion or other surface coating, many of which may also have radioactive elements adhering thereto which emit Alpha, Beta or Gamma radiation. The removal of these harmful airborne substances from the air breathing zone or area of generation is necessary to protect both personnel and the environment from their harmful effects.

The apparatus typically employed for removing these contaminants comprises air filtration, cleansing, scrubbing, or washing systems or units, or other such equipment. These systems function to remove the contamination by such means in filters, adsorbers, absorbers or washers and the air exits the system in a cleaner condition than when it entered. At times, the air flow must be directed through several filters, scrubbers, adsorbers or adsorbers to effectively remove the contaminant to a level considered safe enough for release to the atmosphere for breathing.

Typically the systems available to perform this air cleaning are comprised of a prime mover or air blower unit including a motor, usually electric, but also may be hydraulic or compressed air or internal combustion, with the motor powering a fan or blower device. The motor may connect to the blower or fan either directly to the motor shaft or via a belt and pulley or gear or clutch train which may give an increase or decrease in the motor applied speed or torque. One arrangement has the blower air discharge or positive pressure side connected to a housing or plenum box that contains the filter, adsorber or other desired air cleansing device or a combination thereof. The connection between the blower and the filter housing is most commonly made by a piece of duct work, or a boot of steel or fabric, or rubber or composite material. Since the blower discharge is usually smaller than the filter housing inlet there is commonly a transition from small to large that is called a plenum that directs the air flow into and through the filter housing.

This type connection (transition/plenum) is commonly repeated on the downstream, outlet side of the filter housing to allow the routing of the discharge air flow through a duct work to a desired location. An alternate configuration of such a system is to locate the blower fan and motor on the downstream side of the filter housing such that the blower creates a negative pressure on the filter housing and causes air to flow through the filtration mechanism.

The most common denominator in such prior systems is that the components are assembled into a fixed arrangement of the filter train suitable for an intended purpose and are confined to that arrangement only. They cannot readily be reconfigured by the user to perform some other air cleaning function or to allow relocation of the air filter housings or modules containing the air cleaning elements in relation to each other and to the blower/motor, or to provide for the addition or removal of filter housings or other components should changing job situations require a modification of the air filtration train by the rapid addition or removal of air cleaning elements, or the rearrangement of the component sequence.

Additionally, the components cannot readily be removed from the common mounting frame to allow their use in some other air cleaning system. If a component of such a system could be removed, it would be difficult to reconnect it to another component because it would not be designed to mate with another part and would require affixing inlet and outlet plenums of a type that would facilitate connecting that component to another with some type of air duct or hose. In this regard, the inlet connections on these systems are usually of a fixed design limiting the size, or number or location to those inlets built into the system. Also, the connecting of accessories or appliances or work assisting devices to the air inlet of these units must be accomplished by interconnecting the desired appliance to the inlet of the air cleaning system with a duct, hose, flexible duct or other such conduit for interconnecting and promoting air flow between the accessory and air cleaner system.

These accessories or appliances may be, e.g., a Capture Velocity Hood, or Down-draft Table, or Funnel Arm or other such desired device or appliance designed to direct the air flow so as to contain the flow and entrapped contaminants in the air stream until they are removed by the air cleaning elements of the system. The failure of these typical systems to allow easy component relocation or reconfiguration, or the simple interconnection of various components and/or the direct attachment of accessories or appliances to the system for performance enhancement is a serious drawback to their practical utility.

OBJECTS OF THE INVENTION

Accordingly, objects of the present invention are:

to provide a new and improved portable air cleaning system, or device that overcomes the above mentioned disadvantages of the prior devices or apparatus;

to provide an air cleaning system of modular interchangeable, interconnecting, "self docking" (connecting) modules which may be assembled by the user to provide a desired configuration, by combining a desired quantity of air filters, or adsorbers, or absorbers, or scrubbers or other such devices in the desired sequence thus accommodating the users specific air cleaning requirements;

to provide an air cleaning system whose components are modular in nature so that each module may substitute for one another in the air filtration process and additional components may be easily added to or removed from the air stream as desired;

to provide a means for each module to mate, "dock" with (interconnect) each other module in such a manner as to preclude the necessity for any additional interconnecting device such as a boot, flex duct or hose or other such item or require tools or fasteners to accomplish the docking/interconnection; to provide a "docking adapter" which also functions as a connector which allows the interconnection of the modules with a boot, flex duct or hose should the user so desire to interconnect the modules in that manner;

to provide a Quick Mount Cart device that, preferably has wheels similar in design to that of a "handstruck", that will mount and configure the modular system components in commonly used configurations, a typical preferred configuration being: a filter housing Module containing a Prefilter and a High Efficiency Particulate Air (HEPA) filter upstream of and connected to a downstrean electric motor-driven Blower that sucks air through the upstream filters, passes through the blower and is discharged, such cart to serve as a common mounting frame that enables the "self docking feature" of each modular component to mate, male-to-female or the reverse, such that a seal is accomplished to contain and direct the flow of air through the assembled system modules and is completed without the use of additional interconnecting boots, ducting or tools, fasteners or such;

to provide a Quick Mount Cart designed such that the "self docking" feature of two or three or four or more modular components, each of which may contain the same or different air cleaning elements or filters, may be mounted in multiple configurations as selected by a user, such that the assembled filtration train performs a desired air cleaning function, the Quick Mount Cart to serve as a common mounting frame that enables the "self docking feature" of each modular component to mate, male-to-female or the reverse, such that a seal is accomplished to contain and direct the flow of air through the assembled system modules and is completed without the use of additional interconnecting boots, ducting or tools, fasteners or such;

to provide a modular air cleaning system that, if so desired by the user, the individual modules may be removed from any cart, frame or platform and each module used independently of, or in combination with each other module or other non-modular component, whether such component was originally provided as part of the "System" or not, in any desired configuration and/or sequence, such interconnection of the modules being performed by use of flex duct, hose or other common method for portable equipment and so permitted by the unique design of the combination "Docking Adapter"/"Flex Duct Connector" provided on each system Module;

to provide Filter Modules that may contain the desired pre-filter and/or particulate air filter in combination or alone, such as a High Efficiency Particulate Air (HEPA) filter of any efficiency and/or Carbon Adsorber or Absorbant element or other desired air cleaning element not specifically included by name herein but common in such air cleaning systems;

to provide a System whose Filter Module, containing a filtration element which, when such element becomes depleted, clogged or exhausted and requires replacement, allows the Filter Module containing such element to be quickly and easily removed from the air filtration system and a Filter Module containing pre-loaded and, if so required, tested, new, unclogged, clean elements inserted into the system, thus permitting the Filter Module with expended elements to have its filter elements replaced away from the worksite or point-of-system use in a location which is appropriate to changing such expended elements safely with regards to containing the contaminant and preventing release thereof and or exposure thereto of the environment or personnel to the contaminant, such filtration element changeout commonly to be performed in a containment device or room of appropriate design;

to provide a system that allows easy, rapid change of Filter Module "Inlet Adapters" to accommodate in difficult situations different sizes and/or quantities of inlet air duct, flex duct or other air handling conduit;

and to provide a modular air cleaning system that incorporates the capacity to directly attach, in an easy and expeditious manner, work enhancing accessories and appliances such as "Capture Velocity Air Flow Backdraft Hoods", other types of "Backdraft Hoods" or "Capture Velocity Air Flow Downdraft Hoods" or other types of "Downdraft Hoods", or "Capture Velocity Air Flow 55 Gallon Drum Inspection Devices" or other types of air flow, drum inspection devices, or "Snorkle Arm Inlet Hose" devices or other devices that may be desired to influence, direct, shape and control air flow such that the flow is enhanced to capture and maintain contaminants in the air system where they are transported through the air cleaning system for their ultimate reduction and/or removal from such air stream.

SUMMARY OF THE INVENTION

The above and other objects hereinafter appearing have been attained in accordance with the present invention which is defined in its broad sense as a modular air cleaning system comprising a filter module having a closed plenum box provided with male and female air flow porting means, one of which porting means provides an air inlet and the other of which provides an air outlet for said plenum box, each of which porting means is in substantially cylindrical form and projects outwardly from said box, said porting means each having a section of substantially the same diameter lying adjacent said box, shoulder means on each said section peripherally circumscribing the same at a short distance outwardly from said box and adapted to engage end portions of a flexible hose for preventing its withdrawal from the said sections, said male porting means having a reduced diameter segment lying axially outwardly of the adjacent section and adapted to telescope within the female porting means of another plenum box, and annular sealing means within said female porting means adapted to engage said segment and form a substantially gas-tight seal thereagainst.

In certain preferred embodiments:

The above system contains at least two filter modules of substantially the same structure and configuration mounted in substantial axial alignment on a base wherein said annular sealing means of one module is in sealing engagement with the end of a reduced diameter segment of another module, and wherein cooperating clamping means is provided on said base and said modules for maintaining said modules axially in a sealed, unitary combination;

The above system wherein air moving means is provided with inlet and outlet porting means and is held in sealing, unitary arrangement by cooperating clamping means on said air moving means and an adjacent filter module, with one of its porting means telescoped with mating porting means of said adjacent module;

The above system wherein multiple modules are interconnected by said flexible hoses;

The above system wherein multiple modules are interconnected by said flexible hoses;

The above system wherein one component of said clamping means is provided on wheeled cart means;

The above system wherein the inlet and outlet porting means of said air moving means are of substantially the same configuration and dimensions of the porting means of an adjacent module;

The above system wherein the cover section of said module is provided with access cover means for the insertion and removal of filter or other pre-cleaning elements therein; and The above system wherein either or both of said male and female porting means is supported on removable plate means affixed to said plenum box.

The preferred construction of the present system is stainless steel for the Filter Modules, Carts and accessories or appliances as this material is corrosion resistant, cleans easily, has aesthetically pleasing qualities but any suitable material such as carbon steel, plastic, fiberboard or composite or laminates that lend themselves to fabrication of the necessary components may be used. The size of the modular components is relative to the desired air flow volume and force or power required to cause the air to pass through the assembled air cleaning system and as such is variable. The term "portable" and/or "modular" as herein used primarily applies, but is not limited to, a system of modular components that may be handled by one or two persons of average strength, relocated with mobile handling carts or carried on transported on a conveyance such as a platform truck, or handtruck or other common device used to assist in the movement or relocation of objects that may be more readily handled by the use of such a fatique reducing handling device and assembled without the use of heavy equipment such as cranes, however, this does not preclude the intent of the design to be extended to components of a much larger and heavier nature.

BRIEF DESCRIPTION OF THE DRAWINGS

FIG. 2 is a side view of the system of FIG. 1 in assembled condition;

FIG. 3 is a top view of the system of FIG. 2;

FIG. 4 is an end view of the system of FIG. 2 looking into the female inlet;

FIG. 10 is a longitudinal (axial) cross-sectional view of the male porting means;

FIG. 11 is a longitudinal (axial) cross-sectional view of the female porting means.

DETAILED DESCRIPTION OF THE PREFERRED EMBODIMENTS

Figure 1:
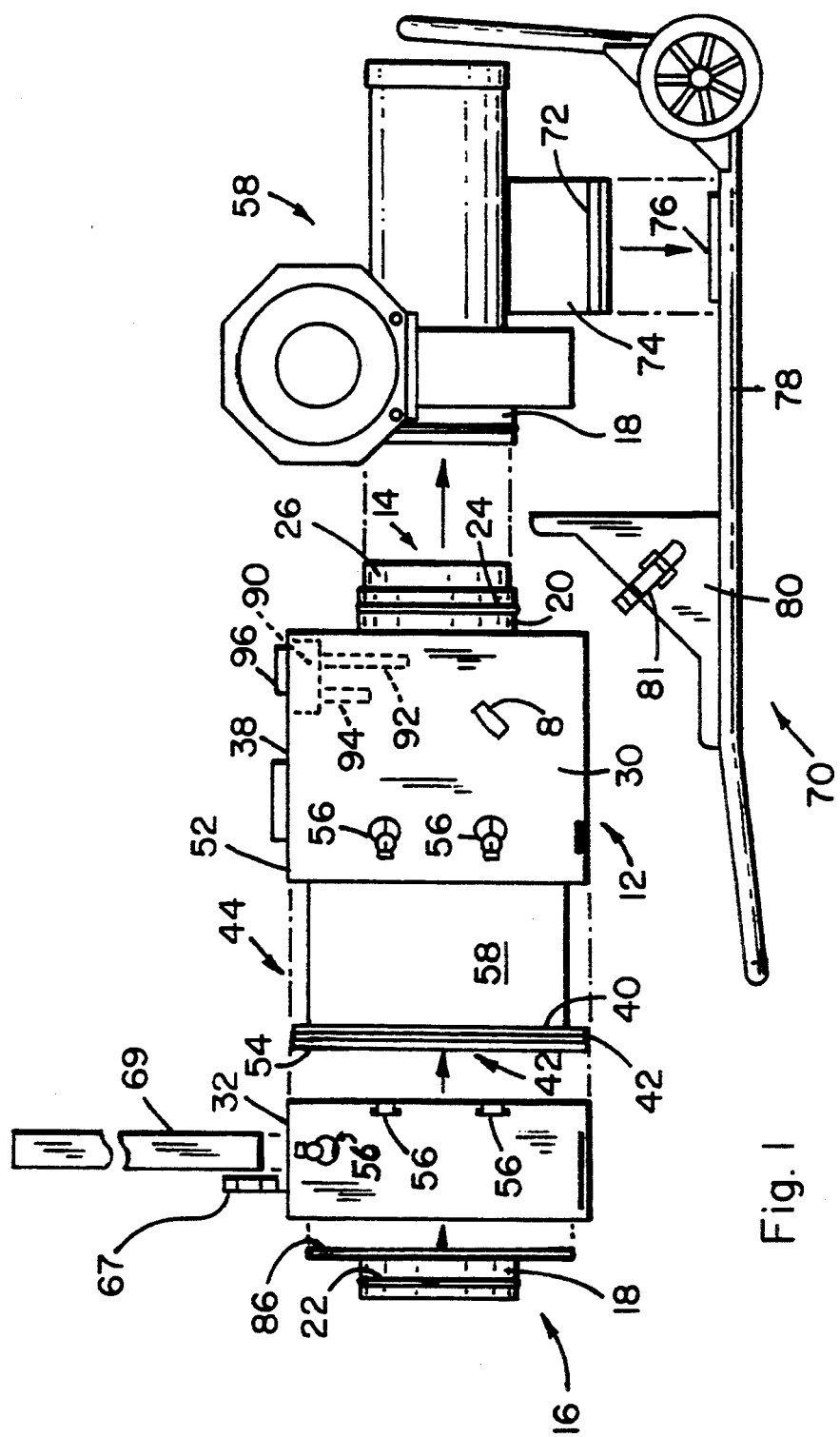
FIG. 1 is a exploded view of a portable modular air cleaning system in accordance with the present invention primarily depicting a portable filtration module, a portable power module and a quick mount cart.
Figure 5:
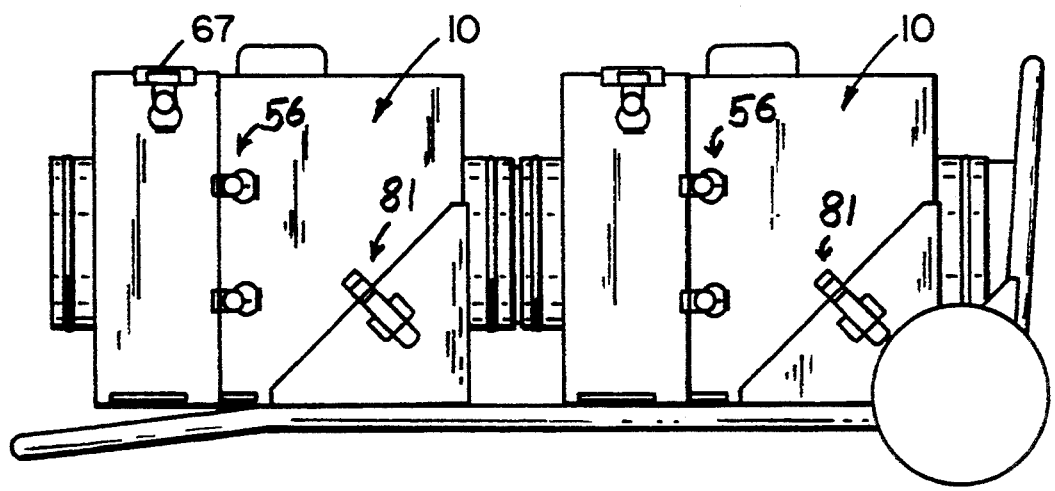
FIG. 5 is a side view as in FIG. 2 showing two filter modules mounted on a cart in operating position.
Figures 6, 7:
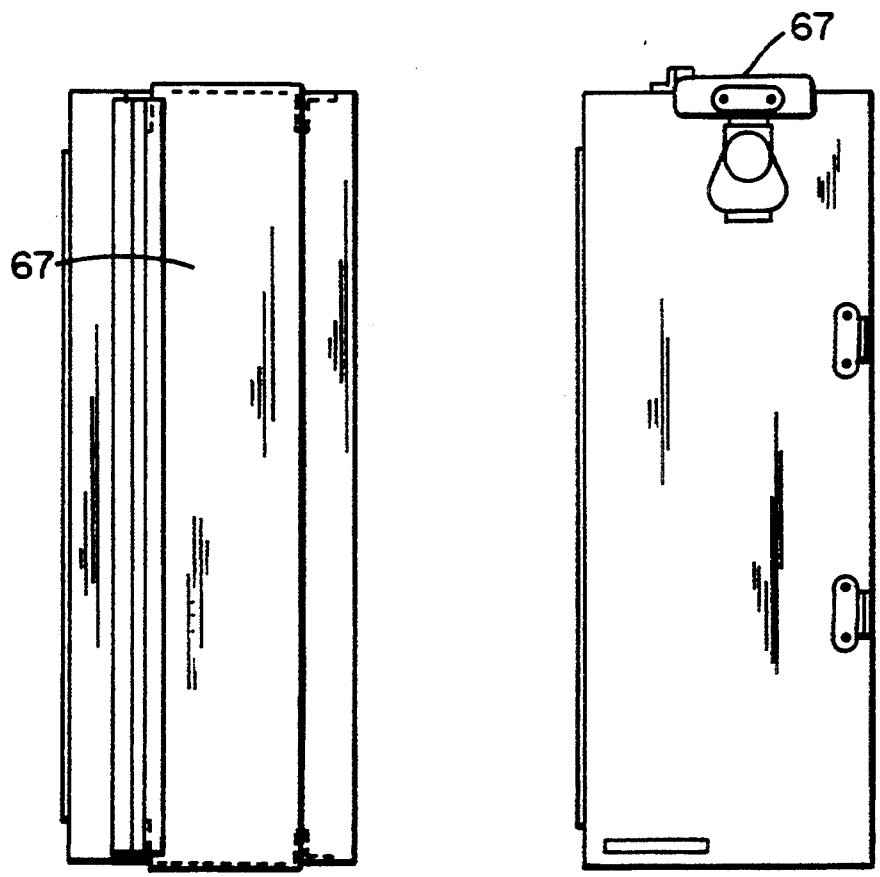
FIG. 6 is a top view of the filter module cover.
FIG. 7 is a side view of the filter module cover.

Referring to the drawings and with particular reference to the claims hereof, the present modular air cleaning system comprises a filter module 10 having a closed plenum box 12 provided with male and female air flow porting means 14 and 16 respectively, one of which porting means provides air inlet means and the other of which provides air outlet means, each of which porting means is in substantially cylindrical form and projects outwardly from said box, said porting means each having a section 18, 20 of substantially the same diameter lying adjacent said box and each having a shoulder means 22, 24 peripherally circumscribing the same at a short distance outwardly from said box and adapted to engage end portions of a flexible hose 25 for preventing its withdrawal from the said sections, said male porting means 14 having a reduced diameter segment 26 lying outwardly of the adjacent section and adapted to telescope within the female porting means of another plenum box, and annular sealing means 28 within said female porting means adapted to engage said reduced diameter segment and form a substantially gas-tight seal thereagainst.

The plenum box 12 is comprised of a filter housing section 30 and a cover section 32. Section 30 is provided with a continuous seating ledge 34 around the inside 36 of its wall 38 against which the inner gasket 40 of the mounting flange 42 a filter unit 44 is compressed. This compression is caused by a metal edge such as 46 of the wall 50 of the cover section 32 as section 32 is moved over the forward end 52 of section 30 and edge 46 is forcibly engaged with outer gasket 54 of filter module or unit 44 and retained thereagainst by latch means 56. Also, moisture separators, spark arrestors or the like may be empoyed.

The filter unit 44 has a tubular body 58, e.g., square or rectangular to fit within section 30 and substantially fill the same. Body 58 typically contains a mesh or matrix element 59 of specialized filtering material which is especially designed and formulated to remove specific airborne materials. A large variety of such elements are commercially available.

The top of cover section 32 is provided with a slot-like opening 60 which provides entry into a chamber or track 62 defined by inner vertical ledges 64 and 66 affixed to the inner wall of section 32, between which any of a variety of prefilter elements 69 can be slid. A latchable lid 67 maintains the integrity of the air-tight filter system. Such elements may comprise, for example, matrices of spun metal, glass, or fiber, or supported beds of filtering clays or the like for removing large particles such as asbestos fibers or fly ash so as not to unnecessarily clog the downstream specificalized filter material of unit 44 with easily filterable trash. A plurality of such chambers or tracks may be provided.

The filter modules 10 and power module 68 may be carried on a quick mount cart such as 70 which is uniquely constructed to maintain these structures in air-tight sealed arrangement. For this purpose, the mounting structure, i.e., bolt flanges 72 on the motor-blower mount 74 and bolt flanges 76 on the cart frame 78, and the bolt holes through each, are specifically located with respect to seats 80 affixed to frame 78 such that seating of the modules within seats 80 and locking them therein by latches 81 will necessarily form the air-tight seals provided by engagement of segments 26 with sealing means 28.

Figure 8:
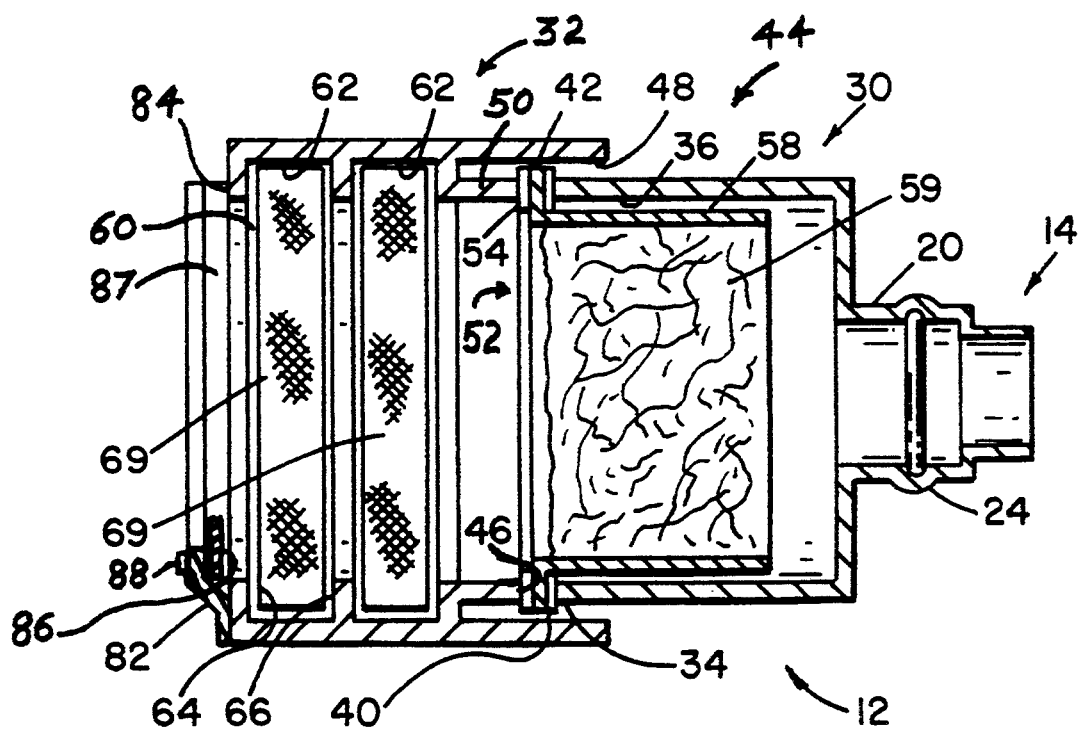
FIG. 8 is a longitudinal cross-sectional top view with certain dimensions enlarged for clarity, of the filter module of FIG. 1 as provided with two pre-filter chambers.
Figure 9:
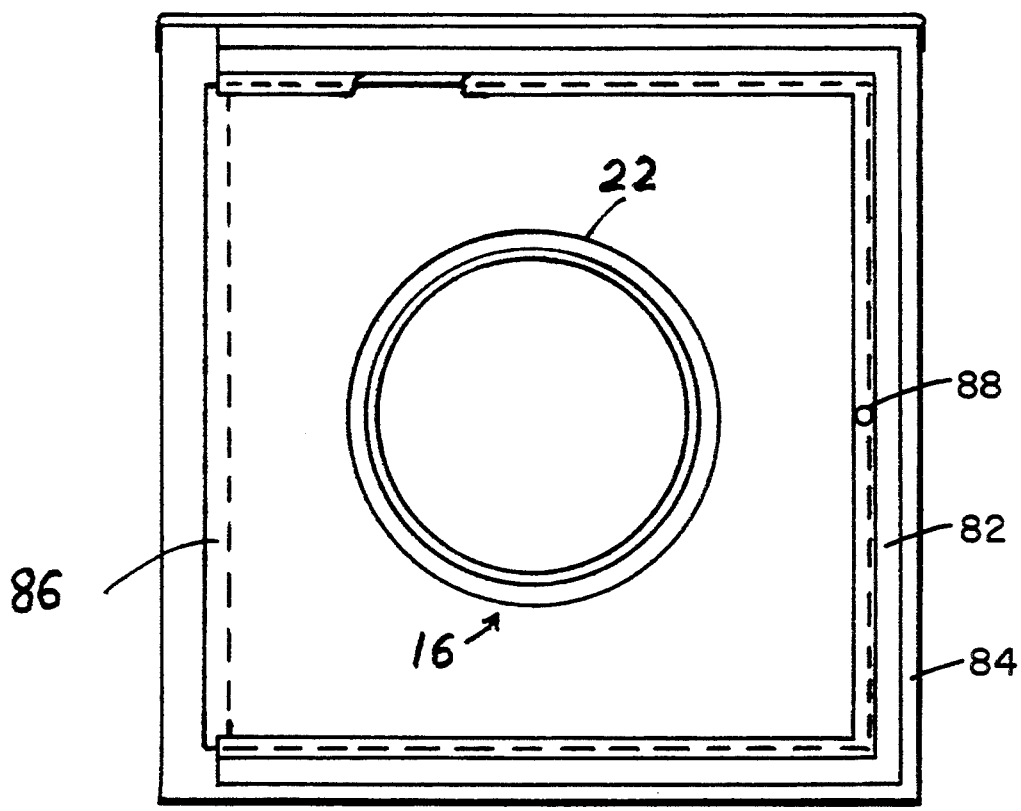
FIG. 9 is a front view with certain dimensions enlarged for clarity, of the filter module cover of FIG. 8 rotated 90° with the porting adaptor plate shown in place.

Referring to the drawings, the front of housing cover 32 preferably is provided with a channel piece 82 affixed to the front wall 84 of the cover to allow support plate 86 of the inlet means 16 to be slid into position in channel 87. A locking screw 88 or the like is used to removably fix plate 86 or a variation thereof into operative position in said channel on the cover. The channel piece 82 in FIG. 8 is oriented for top entry of plate 86, and in FIG. 9 is oriented for side entry thereof.

A differential pressure gauge 90 preferably is provided with one sensor tube 92 communicating with the high pressure side of filter unit 44 and the other sensor tube 94 communicating with the low pressure on downstream side of the unit. Any of such Pitot sensor types and arrangements, in any number may be employed, and may be used in association with automatic signaling or warning devices, e.g., pressure dial 96 for monitoring the condition of the filter unit, such as for replacement.

With reference to the above, the present Filtration unit in its preferred embodiment is capable of providing High Efficiency Particulate Air (HEPA) filtration with about 99.97% @ 0.3 Microns efficiency, at flow rates ranging from about 340 CFM at 5 inches of static pressure to about 500 CFM at 2 inches of static pressure. The unit preferably is an assembly of three (3) components which include:

1) Power Module, comprised of a direct drive blower/motor and base assembly;
2) Filter Module, comprised of a Pre & HEPA Filter housing assembly, prefilter and HEPA filter and;
3) Quick Mount Cart that acts as a handling cart and mounting platform for the Power Module and Filter Module.

POWER MODULE

The Power Module has an integrally mounted motor directly driving a cast aluminum blower. The motor/blower are mounted to a stainless steel base that contains a manual starter with thermal overload protection with a "start-stop" toggle switch and a power cord connector. The Power Module base mounts to studs on the Quick Mount Cart. The Power Module blower inlet is a combination 8" flex duct connector/Female Docking Adapter. As a flex duct connector, the duct is slipped over the connector and clamped by a large hose type clamp or taped in place. As a Female Docking Adapter, a rubber seal inside the adapter is compressed against a sealing surface on the Make Adapter on the Filter Module, coupling the two modules together without need for a boot, hose or other sealing device.

FILTER MODULE

The Filter Module is a portable stainless steel housing for a prefilter, HEPA filter or adsorber element and is a two piece assembly consisting of a housing cover and housing body.

The easily carried module accepts a slide-in prefilter through a separate prefilter compartment door in the filter module housing cover. This separate prefilter compartment allows quick, easy prefilter change-out without disturbing the HEPA filter seal and may be performed without shutting down the unit. The filter module housing cover is also equipped with an "Accesory Track" that accepts a number of different sized flex duct inlet adaptors, 8" flex duct × Female Docking Adapter or special applicances such as a Snorkel Arm or 55 Gallon Drum Capture Velocity Hood. The housing cover is equipped with the 8" flex duct × Female Docking Adapter inlet as standard.

The Filter Module housing body accepts either a HEPA filter element or other elements such as carbon adsorbers or other gas phase adsorber elements. The HEPA filters and adsorber elements are nominally 12"×12" of various depths with a dual gasketed 14"×14" sealing flange on the upstream face. A 0-10" static pressure water differential pressure guage is installed in the Filter Module housing body with a low pressure tap extended to an external tubing connector in the housing cover to permit measurement of the static pressure drop across an installed filter element.

The Filter Module downstream outlet is a combination 8" flex duct connector/Male Docking Adapter. As a flex duct connector, duct is slipped over the nipple and clamped or taped in place. As a Male Docking Adapter, a sealing surface compresses a rubber gasket in a mating Female Docking Adapter which may be installed on either the Power Module or on the inlet of another Filter Module, coupling the two modules together without the necessity for a boot, hose or other sealing device.

QUICK MOUNT CART

The Quick Mount Cart (QMC) functions as a mounting platform and handling device for the Power Module and Filter Module. Constructed from stainless steel tubing for durability and corrosion resistance, the QMC resembles a "handtruck" in design. The QMC has twin mounting studs that locate and secure the Power Module and provides coiled storage for the power cord. A receptacle tray upstream of the Power Module accepts, locates and latches the Filter Module into position, completing a "Docking" of the Filter Housing Male Docking Adapter with the Power Module Female Docking Adapter, forming a quick air tight seal without the need for a connector boot or hose or the use of any tools coupling the two modules together without the necessity for a boot, hose or other sealing device.

Figure 12:
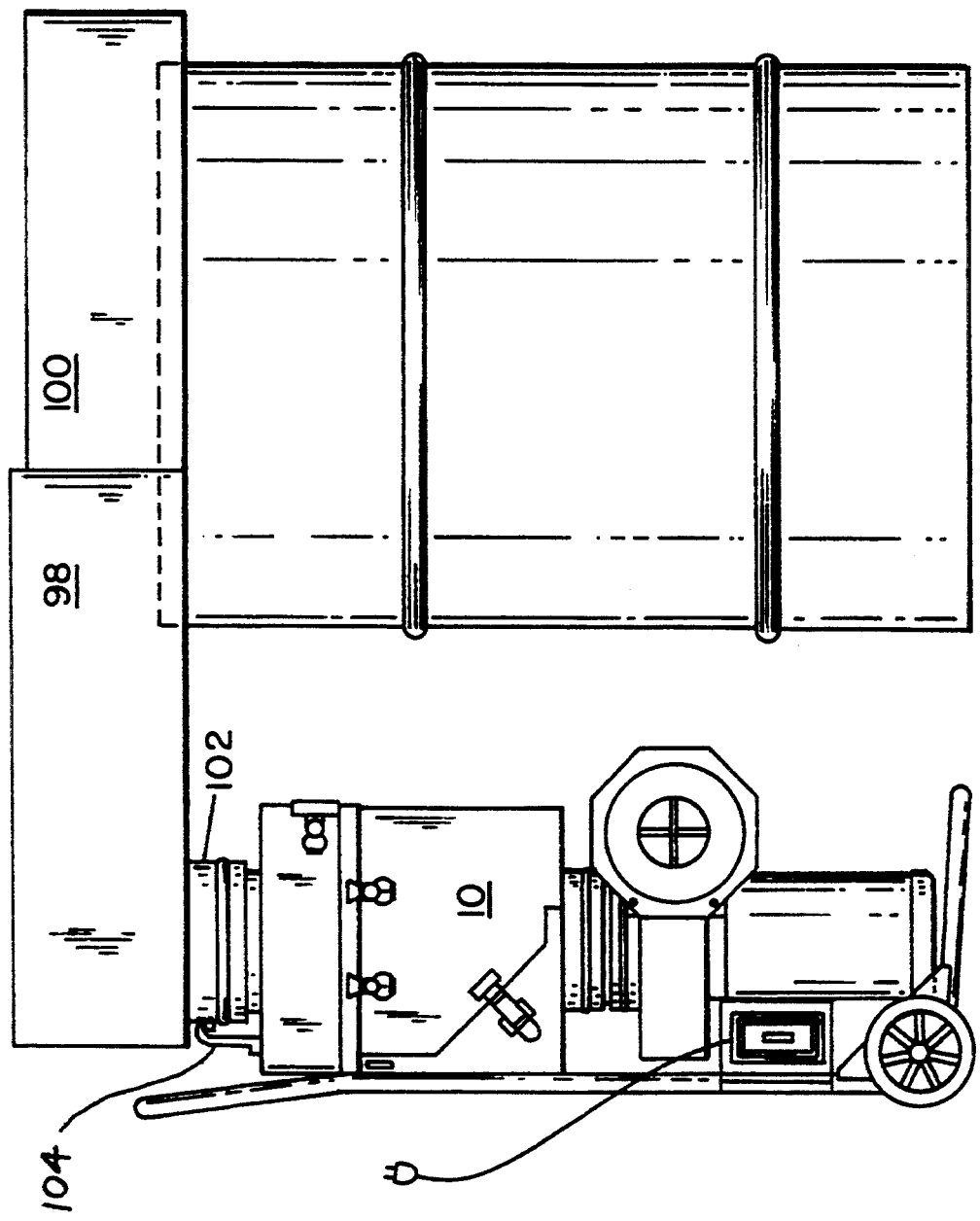
FIG. 12 is a side elevational view of the present system with hood attachment in place over a 55 gallon barrel top.

In FIG. 12 is shown a shroud or hood adaptation for capturing volatile contents of barrels or the like at, e.g., an air flow of up to about 350 linear feet per minute. These hoods contain the airborne pollutants during sampling of the barrel contents. The shroud or hood 9B which may comprise one or more telescoping sections 100 is provided with a male or female porting means 102 for sealing attachment to the porting means of a filter module. Any clamping device such as pull-down type clamping means 104 having one component affixed to the module at spaced locations around the porting means and having the other component fixed to the hood maintain an air-tight seal between the hood and the filter module. The width of the hood is selected to encompass as much of the barrel top as necessary and may be hinged at appropriate locations to render it easier to pivot down very quickly over an opened barrel top to minimize atmospheric contamination. Sealing means in the nature of foamed weatherstripping or the like may be provided on the portions of the hood surrounding the barrel outlet, i.e., the bung or the entire top, for engaging the barrel and providing, at least, a fair degree of gas containment during sampling. Other attachments include a back draft hood for the table top use, or a hood for direct mounting on the inlet accessory track using the upright unit as the stand/support/filter module. These hoods provide adjustable levels of capture velocity air flow to contain contamination within the hood work area and to remove it to the filter. Hoods may be used for work on small components, for repair, decontamination, counting radioactive swipe smears (survey samples) or any other use a person may find to perform inside the hood.

The key to the hood embodiment is that the engineering work is done so the user is assured the air flow is in the proper direction, configuration, flow rate, and the like so that personnel is they are protected and the work is performed in a safe manner as compared to just placing an open ended suction hose near a work point. Many other type of attachments can be developed as users define more applications, needs, and jobs that it may be used on.

The present double filter cart allows a user to select a combination of filter elements, i.e., HEPA for particulate removal, double HEPA for highly toxic materials such as plutonium at a government site, or a HEPA/carbon absorber, or, e.g., other absorber/zeolite element, as required to remove his contaminants. The present System offer greater versatility and enhanced contaminant capture through the use of special appliances that mount in the Filter Module Accessory Track. These accessories ensure that Capture Velocity air flow is applied at the contamination source and is in a suitable configuration for the work to be performed. The Backdraft table to hood provides flow velocities up to 220 feet minute and will maintain contaminant in the hood when performing counting, analysis, or decon processes. In this regard, opening and inspecting drum contents can often lead to unexpected hazardous conditions. The Drum Hood offers a high degree of protection with capture velocities, as aforesaid, up to 350 FPM. Mounted in the accessory track, the hood becomes an integral part of a capture velocity air flow system. The design allows easy access to drum bungs, or, by extending the hood, allows complete lid removal.

Each portable Filter Module will accept a Prefilter, HEPA Filter, Carbon Absorber or optional filter elements. Filter Modules may be arranged in single, double, or triple HEPA, Carbon or mixed element filtration trains as required to suit job requirements. The Power Module may also be used independently as an air mover. The present module design permits quick system set up and configuration changes. Quick-Mount Carts (QMC) allow easy module handling and system relocation. Filter Modules installed on the QMC utilize a built-in "Docking Adapter" which eliminates the need for ducting or couplers between the Filter Modules or Power Modules. Replacement of the filter module is greatly simplified, i.e., just replace the entire Filter Module with a preload, pretested spare. The spent filter element can then be handled in a controlled area at the operator's convenience.

Each stainless steel Filter Module is equipped with a 0–10" D/P Gauge, a quick change Prefilter compartment and a Grade "B" High Efficiency Particulate Air (HEPA) filter or Carbon Absorber element. Optional elements are available for the capture of specific organic vapors. A quick change Accessory Track on the face of each Filter Module accepts a variety of quick mounting inlet adapters or special workplace accessories and appliances. Prefilters, High Efficiency Particulate Air (HEPA) filters for particulate filtration and carbon adsorbers will suite most requirements. Special filters or gas phase adsorber elements such as zeolite or potassium permanganate are available to meet unique requirements.

The invention has been described in detail with particular reference to preferred embodiments thereof, but it will be understood that variations and modifications will be effected with the spirit and scope of the invention.

I claim:

1. A modular air cleaning apparatus comprising a filter module having a closed plenum box provided with male and female air flow porting means, one of said porting means providing an air inlet to said module and the other of said porting means providing an air outlet from said module, each of said porting means being substantially cylindrical in form and projecting outwardly from a respective wall of said plenum box, each of said porting means being constructed to have a first predetermined diameter section extending from the wall of the plenum box to a location a short distance outward from the plenum box wall and a shoulder means formed to peripherally circumscribe said first predetermined diameter section at a location corresponding to said short outward distance from the plenum box wall, said shoulder means being constructed to engage an end of a flexible hose for preventing withdrawal of said hose from said first predetermined diameter section, said male porting means having a reduced diameter segment formed outwardly of said first predetermined diameter section and formed to be received within a female porting means of another plenum box of another filter module, and annular sealing means within said female porting means to engage said reduced diameter segment and form a substantially air-tight seal thereagainst.

2. The apparatus of claim 1 wherein at least two filter modules of substantially the same structure and configuration are provided, wherein said annular sealing means of one module is in sealing engagement with an end of said reduced diameter segment of another module, and wherein clamping means is provided for maintaining said modules axially in a sealed, unitary combination.

3. The apparatus of claim 1 wherein air moving means is provided with inlet and outlet porting means and is held in sealing, unitary arrangement by clamping means with one of its porting means mating with porting means of an adjacent module.

4. The apparatus of claims 1 wherein multiple modules are interconnected by flexible hoses.

5. The apparatus of claim 3 wherein multiple modules are interconnected by flexible hoses.

6. The apparatus of claim 2 wherein said clamping means is provided on wheeled cart means.

7. The apparatus of claim 3 wherein said clamping means is provided on wheeled cart means.

8. The apparatus of claim 3 wherein the inlet and outlet porting means of said air moving means are of substantially the same configuaration and dimension as the porting means of said module.

9. The apparatus of claim 1 wherein said module is provided with access gate means for the insertion and removal of filter elements.

10. The apparatus of claim 1 wherein either or both of said porting means is supported on removable plate means affixed to said plenum box.

11. The apparatus of claim 1 wherein said module is connected to the porting means of a shroud or hood, said shroud or hood being dimensioned to overlie the top of a barrel.

* * * * *